(12) United States Patent
Sanchez

(10) Patent No.: US 9,086,299 B2
(45) Date of Patent: Jul. 21, 2015

(54) WIRELESS DONGLE ANGULAR POSITION SENSOR

(75) Inventor: Jorge Fabrega Sanchez, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 714 days.

(21) Appl. No.: 13/226,647

(22) Filed: Sep. 7, 2011

(65) Prior Publication Data

US 2013/0060517 A1 Mar. 7, 2013

(51) Int. Cl.
*H01Q 3/04* (2006.01)
*G01D 5/14* (2006.01)

(52) U.S. Cl.
CPC . *G01D 5/145* (2013.01); *H01Q 3/04* (2013.01)

(58) Field of Classification Search
CPC ....... G01D 5/142; G01D 5/145; G01D 5/147; H01Q 3/04
USPC ............................ 702/151, 153, 154; 700/302
See application file for complete search history.

(56) References Cited

U.S. PATENT DOCUMENTS

| | | | |
|---|---|---|---|
| 6,140,970 A | 10/2000 | Ylijurva | |
| 2002/0009192 A1 | 1/2002 | Nakamura | |
| 2003/0083063 A1* | 5/2003 | Wang et al. | ................... 455/427 |
| 2007/0173077 A1 | 7/2007 | Wang | |
| 2009/0290313 A1 | 11/2009 | Zhao | |

FOREIGN PATENT DOCUMENTS

| | | |
|---|---|---|
| CN | 1330498 A | 1/2002 |
| CN | 2672805 Y | 1/2005 |
| CN | 2717044 Y | 8/2005 |
| CN | 201197148 Y | 2/2009 |

OTHER PUBLICATIONS

Foreign Communication From a Counterpart Application, PCT Application PCT/US2012/053874, International Search Report dated Jan. 8, 2013, 5 pages.
Foreign Communication From a Counterpart Application, PCT Application PCT/US2012/053874, Written Opinion dated Jan. 8, 2013, 5 pages.
"SAR Compliance Evaluation Report," PCTEST Engineering Laboratory, Inc., Sep. 13, 2010-Sep. 15, 2010, 39 pages.

(Continued)

*Primary Examiner* — Manuel L Barbee
(74) *Attorney, Agent, or Firm* — Conley Rose, P.C.; Grant Rodolph; William H. Dietrich

(57) ABSTRACT

An apparatus comprising a connector, a transceiver connected to the connector, and a processor configured to detect the connector's angular position relative to the transceiver based on a Hall voltage ($V_H$) that corresponds to a magnetic flux passing through a Hall Effect sensor. Also disclosed is a method comprising detecting a Hall voltage ($V_H$), calculating an angle based on the $V_H$, and determining whether the angle is between an upper threshold and a lower threshold associated with a Specific Absorption Rate (SAR) compliance criteria.

34 Claims, 6 Drawing Sheets

(56) References Cited

OTHER PUBLICATIONS

Internal Photographs, EUT Type: Cellular/PCS CDMA/EvDO and 700MHz LTE USB Modem Model MC551, PCTEST Engineering Laboratory Inc. copyright 2010, 8 pages.

Foreign Communication From a Counterpart Application, Chinese Application No. 201280043512.5, Chinese Office Action dated May 19, 2015, 5 pages.
Foreign Communication From a Counterpart Application, Chinese Application No. 201280043512.5, Chinese Search Report dated May 11, 2015, 2 pages.

* cited by examiner

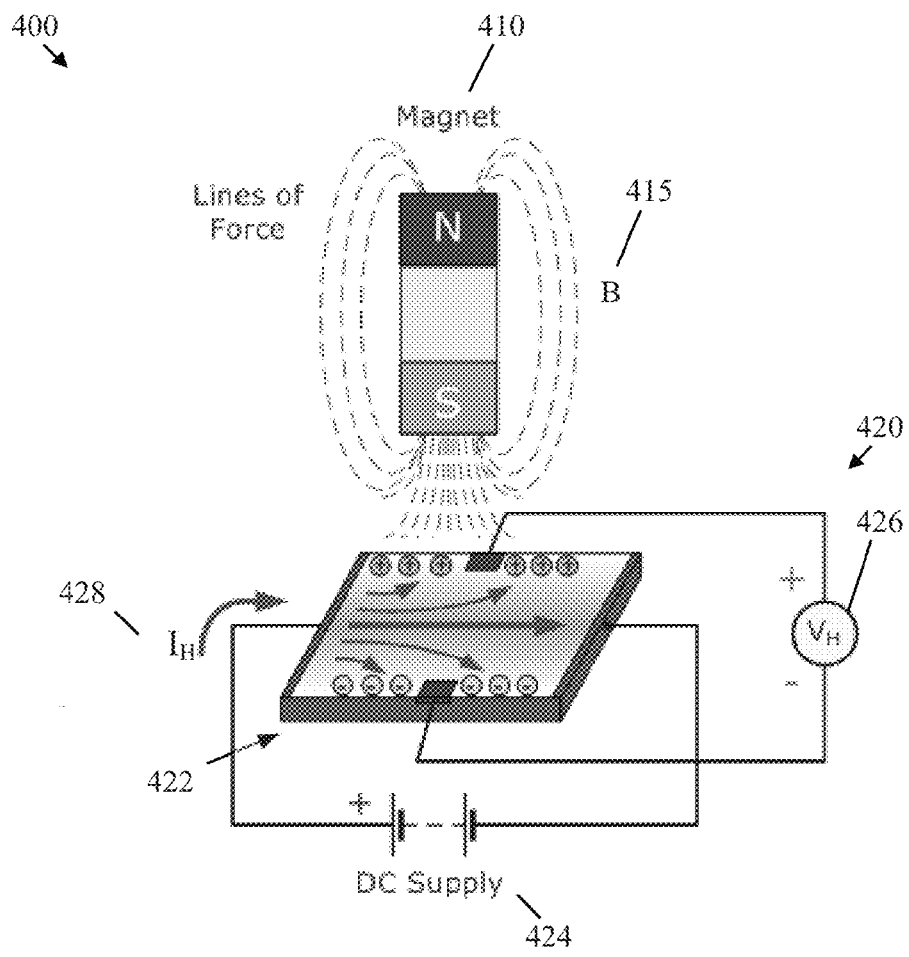
FIG. 4
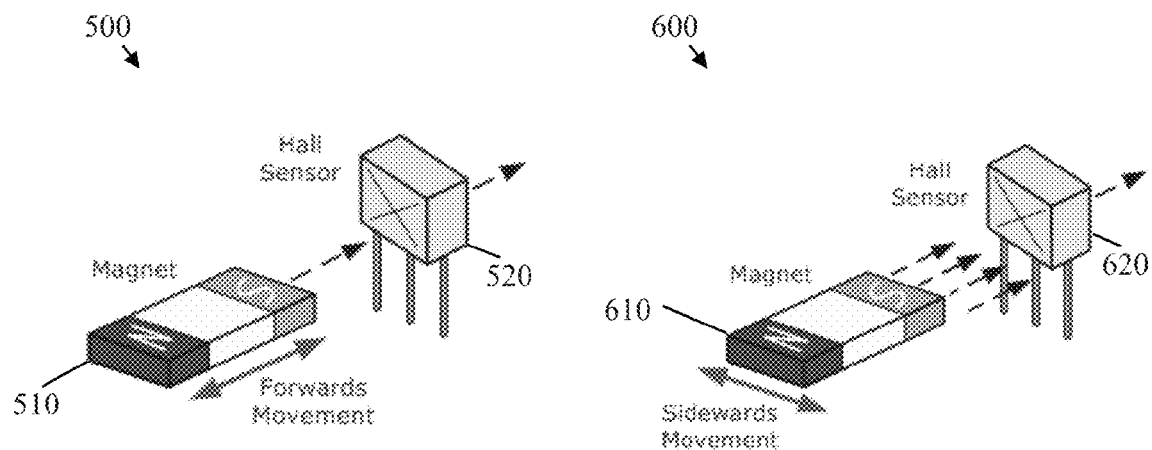
FIG. 5
FIG. 6

WIRELESS DONGLE ANGULAR POSITION SENSOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advances in wireless communication have revolutionized the way we communicate and access information, and has birthed a plethora of wireless capable consumer devices whose affordability and availability have increased over time. Generally, wireless capable consumer devices may communicate with other wireless capable devices by exchanging radio frequency (RF) communication signals via a transceiver, which may be located internally or externally to the device. One type of external transceiver may be a Universal Serial Bus (USB) modem (referred to herein as a USB dongle), which may be inserted into the USB port of a consumer device (e.g., a laptop) to effectuate wireless communication. For instance, a USB dongle may allow otherwise non-wirelessly-enabled devices (e.g., devices without onboard transceivers) to communicate wirelessly simply by installing the appropriate software (e.g., USB dongle drivers, etc.).

RF transmissions may produce RF radiation, e.g., electromagnetic radiation in the frequency range of about three kilohertz (kHz) to about 300 Gigahertz (GHz), which may be harmful to humans at elevated exposure/absorption thresholds. Consequently, the Federal Communications Commission (FCC) has regulated the RF radiation output of various wireless devices, e.g., including USB dongles, to limit the general public's exposure to RF radiation. Some of the FCC's regulations and/or compliance standards may be outlined in Institute of Electrical and Electronics Engineers (IEEE)/American National Standards Institute (ANSI) publication C95.1-1992 entitled "Standard for Safety Levels with Respect to Human Exposure to Radio Frequency Electromagnetic Fields, 3 khz to 300 GHz" and IEEE/ANSI C95.3-2002 entitled "Recommended Practice for Measurement of Potentially Hazardous Electromagnetic Fields—RF and Microwave", both of which are incorporated by reference herein as if reproduced in their entirety.

Specifically, the FCC regulations specify maximum Specific Absorption Rates (SAR) for various RF devices based on different factors. SAR is defined as the rate of RF energy absorption per unit mass at a point in an absorbing body, and may be calculated by the formula:

$$SAR = \frac{\sigma \cdot E^2}{\rho},$$

where $\sigma$ is the conductivity of the tissue simulating material in siemens per meter (S/m), $\rho$ is the mass density of the tissue-simulating material in kilograms per cubic meter (kg/m$^3$), and E is the Total root mean squared (RMS) electric field strength in volts per meter (V/M). To comply with these regulations, some classifications of devices, including USB dongles, must be submitted to a certified testing laboratory (e.g., the PCTEST Engineering Laboratory in Columbia, Md.), where a SAR compliance evaluation is conducted.

SUMMARY

Disclosed herein is an apparatus comprising a connector, a transceiver connected to the connector, and a processor configured to detect the connector's angular position relative to the transceiver based on a Hall voltage ($V_H$) that corresponds to a magnetic flux passing through a Hall Effect sensor.

Also disclosed herein is a method comprising detecting a Hall voltage ($V_H$), calculating an angle based on the $V_H$, and determining whether the angle is between an upper threshold and a lower threshold associated with a Specific Absorption Rate (SAR) compliance criteria.

Also disclosed herein is a method comprising detecting a $V_H$, calculating an angle based on the $V_H$, and determining that an antenna is not optimized for the angle.

Also disclosed herein is a system comprising a first device comprising a connector affixed to a transceiver, and a second device comprising a port, wherein the connector is inserted into the port such that the first device can communicate with the second device, and wherein a system component is configured to determine an angle between the connector and the transceiver based on a $V_H$.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 illustrates an embodiment of a Hall Effect configuration.

FIG. 5 illustrates an embodiment of a Hall position sensor configured to detect forwards movement.

FIG. 6 illustrates an embodiment of a Hall position sensor configured to detect sidewards movement.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
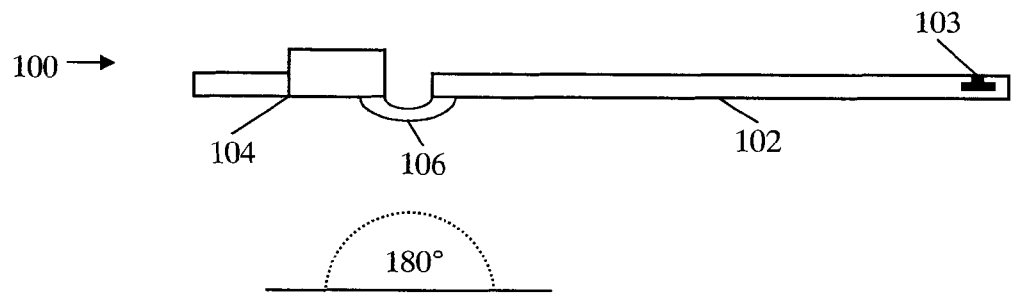
FIG. 1 illustrates an adjustable USB dongle.
Figure 2:
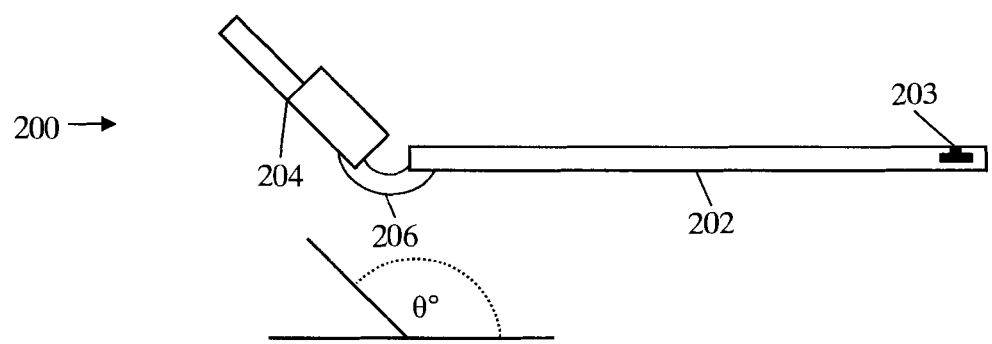
FIG. 2 illustrates another adjustable USB dongle.
Figure 3:
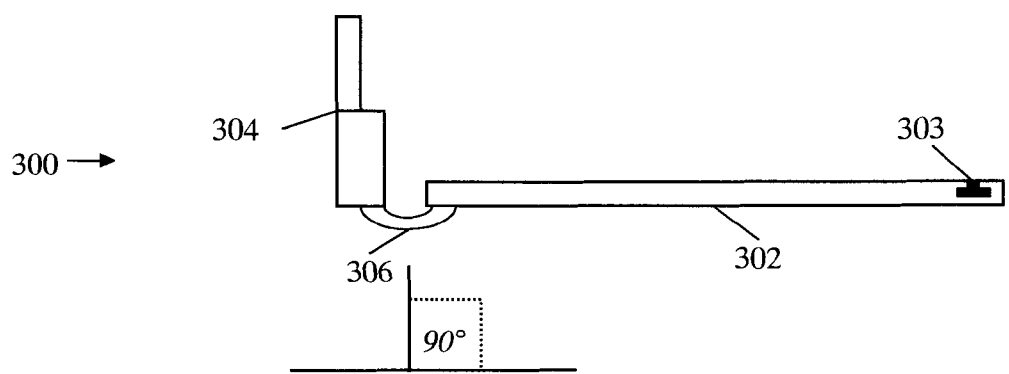
FIG. 3 illustrates another adjustable USB dongle.

Some USB dongles, e.g. adjustable USB dongles, may comprise a hinge feature that allows tuning of the wireless connection. Specifically, the USB dongle's hinge angle may correspond to a relative position of the PCB's antenna, and therefore manipulating the hinge angle may affect antenna efficiency. FIG. 1 illustrates an adjustable USB dongle 100 having a hinge angle of approximately 180°. The USB dongle 100 may comprise a USB PCB 102 (e.g., which may be encased in a protective housing), a USB connector 104, and a hinge 106 that connects the USB PCB 102 to the USB connector 104. The USB PCB 102 may comprise an RF transceiver circuit which may include, inter alia, an antenna 103. In some embodiments, the antenna's 103 length and/or the antenna's 103 matching circuit may be adjustable such that the antenna 103 may be tuned. The USB connector 104 be any connector, e.g., a standard or mini USB connector, that allows a device (e.g., laptop, etc.) to communicate with the USB PCB 102 using a USB protocol. The hinge 106 may be any mechanical mechanism that facilitates the manipulation of the USB connector's 104 angular position relative to the USB PCB 102, which may be referred to herein as the hinge angle. FIG. 2 illustrates an adjustable USB dongle 200 having a hinge angle configuration of approximately θ, where 90°<θ<180°. The USB dongle 200 may comprise a USB PCB 202, an antenna 203, a USB connector 204, and a hinge 206, which may be similar to the USB PCB 102, the antenna 103 the USB connector 104, and the hinge 106 of the USB dongle 100. FIG. 3 illustrates an adjustable USB dongle 300 having a hinge angle configuration of approximately 90°. The USB dongle 300 may comprise a USB PCB 302, an antenna 303, a USB connector 304, and a hinge 306, which may be similar to the USB PCB 102, the antenna 103, the USB connector 104, and the hinge 106 of the USB dongle 100.

As can be seen in FIGS. 1, 2, and 3, USB dongles may achieve a hinge angle anywhere from about 90° to about 180°. However, those of ordinary skill in the art will recognize that some USB dongles may achieve hinge angles greater than 180°, e.g. of up to about 270° or more, and/or hinge angles less than 90°. Additionally, while the USB dongles 100-300 are depicted in a horizontal-up position (e.g., the USB connector is horizontal, and the USB PCB hinges upward), those of ordinary skill in the art will recognize that novel aspects of this disclosure are adaptable and/or compatible to other USB dongle configurations as well, e.g., horizontal-down, vertical-front, vertical-back, tip, etc.

The transceiver's antenna efficiency may depend on the hinge angle, as well as a variety of other factors, e.g., antenna placement, antenna design, antenna technology, feed point locations, etc, and hence different hinge angles may effectuate different wireless performance characteristics. For instance, a hinge angle of about 120° may generally allow for greater antenna efficiency than other hinge angles, e.g., hinge angles of about 90°, about 150°, and/or about 180°. As such, a user may adjust the USB dongle's hinge angle to optimize antenna efficiency and/or to increase wireless performance characteristics (e.g., bit-rate). However, a user may adjust the USB dongle's hinge angle for various non-performance related reasons (e.g., to reduce an effective spatial characteristic of the consumer device) or for no reason at all (e.g., arbitrarily or when the USB dongle is incidentally jarred). For instance, when the USB dongle is inserted into a USB port located on the side of a laptop, the user may manipulate the hinge angle (e.g., to about 90°) to reduce the effective width of the laptop (e.g., the width of the laptop plus the horizontal length of the extended USB dongle), thereby allowing the laptop to be used in a confined area, such as in a car or on a plane.

The amount of RF radiation emitted by the USB dongle's wireless transceiver may be a function of, inter alia, transceiver output (O/P) power and antenna efficiency. For instance, a hinge angle of about 120° may produce lower RF radiation emissions than other hinge angles, e.g., hinge angles less than 110° or greater than 130°, when transceiver O/P power is kept constant. Hence, the transceiver's O/P power may be adjusted based on the hinge angle to regulate RF radiation. In the United States, the SAR limit for adjustable USB dongles may be about 1.6 watts per kilogram (W/kg). Consequently, the USB dongles may need to reduce transceiver O/P power levels to satisfy SAR compliance criteria. For example, a USB dongle may operate at a maximum transceiver O/P power level (e.g., about 23.8 decibels (dB) of a milliwatt (dBm)) when the hinge angle is within a certain threshold (e.g., between about 110° and about 130°), and a reduced transceiver power level when a hinge angle that is not within the threshold (e.g., less than 110° or greater than about 130°). Alternatively, there may be different hinge angle thresholds associated with different O/P power levels, e.g., a maximum transceiver O/P power level for a hinge angle between about 110° and about 130°, an intermediate transceiver O/P power level for a hinge angle between about 90° and about 110° or between about 130° and about 150°, and a minimum transceiver O/P power level for hinge angles greater than 150°. However, the USB dongle must first determine the present hinge angle before reducing the transceiver O/P power to comply with SAR requirements. As such, an effective and hardware feasible method for determining the hinge angle of a USB dongle is desired.

Disclosed herein is a method and apparatus for electronically detecting the hinge angle of a USB dongle using a Hall sensor and a magnet. In an embodiment, the magnet may be a permanent magnet positioned on or near the USB connector, and the Hall sensor may be positioned on or near the USB PCB. The Hall sensor may be configured to detect a $V_H$ that corresponds to the magnetic flux produced by the magnet, which may vary depending on the hinge angle. The $V_H$ may be communicated to a processor, which may calculate the hinge angle based on the $V_H$. In an embodiment, the hinge angle may be used to determine when the O/P power of the USB dongle's transceiver should be backed off to comply with FCC SAR requirements. Additionally or alternatively, the hinge angle may be used to optimize antenna performance by adjusting the antenna's length and/or the antenna's matching circuit based on the hinge angle.

As used herein, the term 'antenna length' may refer to an antenna's electrical length, an antenna's physical length, or both (where appropriate). Additionally, USB dongles may comprise various multi-transceiver configurations and/or multi-antenna configurations. For instance, a USB dongle may comprise separate antennas for transmission and/or reception, (e.g., a first antenna for transmission/reception, a second antenna for transmission only, a third antenna for reception only, etc.). USB dongles may also comprise a main antenna and a diversity antenna for wireless wide area networking (WWAN), as well as one or more auxiliary antennas for WWAN and/or non-WWAN transmissions (e.g., global positioning systems (GPS), etc.). According to aspects of this disclosure, any antenna, or combination of antennas, in the USB dongle may be selectively adjusted based on the USB dongle's hinge angle. Additionally or alternatively, a USB dongle may comprise one or more matching circuits, which may be adjusted (or changed/substituted) based on hinge angle. A matching circuit may be any circuitry designed to match an antenna's input impedance to the impedance of a corresponding transmission medium (e.g., a physical connection coupling the antenna to the transmitter/receiver circuitry). Some matching circuits may comprise adjustable componentry (e.g., variable capacitors, switches, etc.) that enable the matching circuits to be tuned, e.g., in conjunction with the antenna or otherwise. According to aspects of this disclosure, one or more matching circuits may be tuned (and/or substituted) depending on the USB dongle's hinge angle. Such tuning or substitution of the matching circuits may be performed independently or in conjunction with a corresponding tuning of an antenna, adjustment of the transceiver's O/P level, or both.

Although USB interfaces are discussed herein, those of ordinary skill in the art will understand that one or more novel aspects of this disclosure may be applied to adjustable transceivers that communicate with consumer devices via other, e.g., non-USB, interfaces. For instance, the adjustable transceiver may communicate with the consumer device via a Firewall connection, such as that described in IEEE 1394, which is incorporated herein by reference as if reproduced in its entirety.

FIG. 4 illustrates a diagram of an embodiment of a Hall Effect configuration 400. The Hall Effect configuration 400 may comprise a magnet 410 and a Hall sensor 420, which may be arranged as shown in FIG. 4. The magnet may comprise any device or material that produces a magnetic field (B field) 415. The Hall sensor 420 may comprise a Hall element 422, a direct current (DC) supply 424, and a means for detecting a Hall voltage ($V_H$) 426, which may be arranged as shown in FIG. 4. The Hall element 422 may comprise a semiconductor material (e.g., a positive (P)-type semiconductor) over which a potential voltage from the DC supply 424 is applied, resulting in a current flow ($I_H$) 428 that passes through the Hall element 422.

In an embodiment, the B field 415 may produce a magnetic flux, which may correspond to a magnitude of the B field 415 passing through the Hall element 422 at a discrete instance in time. The magnetic flux may vary depending on the spatial orientation and/or position of the magnet 410 relative to the Hall element 422. Specifically, the magnetic flux may exert a force (e.g., a Lorentz force) on the Hall element 422 that acts perpendicularly to the $I_H$ 428, thereby deflecting some of the charged particles (e.g., electrons, etc.) to one side of the Hall element 422. Such deflection may create a voltage potential across the Hall element 422, which may correspond to the $V_H$ 426. Specifically, the $V_H$ 426 may correspond to the distance between the magnet 410 and the Hall element 422, the angular orientation of the B field 415 relative to the Hall element 422, or both. For instance, the value of the $V_H$ 426 may be greater when the B field 415 is perpendicular to the Hall element 422's face, and less when the B field 415 is parallel to the Hall element 422's face (e.g., assuming the distance between the magnet 410 and the Hall element 422 is static). Further, the value of the $V_H$ 426 may be greater when the magnet 410 is close to the Hall element 422, and less when the magnet 410 is further from the Hall element 422 (e.g., assuming the angular orientation of the B field 415 relative to the Hall element 422 is static). As discussed in greater detail below, these relationships may allow the relative position of the magnet 410 to the Hall element 422 to be calculated as a function of the $V_H$ 426.

FIG. 5 illustrates an embodiment of a Hall Effect configuration 500 comprising a magnet 510 and a Hall sensor 520, which may be configured somewhat similarly to the magnet 410 and the Hall sensor 420, respectively. As the magnet 510 approaches the Hall sensor 520, the Hall sensor 520 may identify a forwards movement by detecting an increase in the $V_H$, e.g., corresponding to an increase in the magnetic flux. Accordingly, the Hall sensor 520 may generate an output signal that corresponds to a distance of the magnet 510 from the Hall sensor 520. For instance, the output signal may be a function of the linear distance between the magnet 510 linear distance from the Hall sensor 520.

FIG. 6 illustrates an embodiment of a Hall Effect configuration 600 comprising a magnet 610 and a Hall sensor 620, which may be configured somewhat similarly to the magnet 410 and the Hall sensor 420, respectively. The Hall sensor 620 may identify a sidewards movement of the magnet 610 by detecting the presence of the magnet's 610 B field as it moves across the Hall sensor's 620 active face (e.g., the face marked with an X). Accordingly, the Hall sensor 620 may generate an output signal that corresponds to the magnet's 610 relative horizontal position to the Hall sensor's 620 active face. For instance, the output signal may be a function of the magnet's 610 relative position along an axis that is parallel to the Hall sensor's 620 active face.

In an embodiment, a Hall sensor may comprise the functionality of both the Hall sensor 520 and the Hall sensor 620, such that a two dimensional proximity of a magnetic may be tracked. Similar concepts may be used to track any combination of directions occurring in a parallel and/or perpendicular plane to the Hall sensor's active face, thereby allowing the magnet's position to be tracked across various orthogonal planes. Further, the Hall sensor may comprise multiple active faces such that a three dimensional proximity of the magnet may be tracked.

Figure 7:
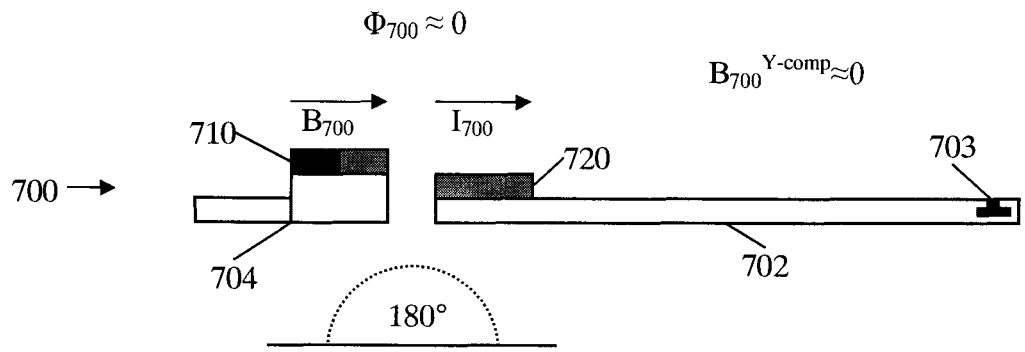
FIG. 7 illustrates an embodiment of a USB dongle configured to utilize a Hall sensor to detect a hinge angle.

A Hall sensor may also be employed to detect a USB dongle's hinge angle, which may correspond to a USB connector's rotational position relative to a USB PCB. FIG. 7 illustrates a USB dongle 700 comprising a USB connector 704 affixed to a magnet 710 and a USB PCB 702 comprising an antenna 703 and affixed to a Hall sensor 720. In some embodiments, the Hall sensor 720 may be affixed to the USB connector 704 (e.g., rather than the USB PCB), while the magnet 710 may be affixed to the USB PCB 702 (e.g., rather than the USB connector 704). Alternatively, one of the magnet 710 or the Hall sensor 720 may be located on a consumer device (e.g., in close proximity to the USB port), while the other of the magnet 710 or the Hall sensor 720 may be located on the USB PCB 702. The USB connector 704, the USB PCB 702, and the antenna 703 may be configured similarly to the USB connector 104, the USB PCB 102, and the antenna 703 (respectively), while the magnet 710 and the Hall sensor 720 may be configured similarly to the magnet 410 and the Hall sensor 420 (respectively). The USB dongle 700 may comprise a hinge angle of about 180° such that the magnet's 710 magnetic field ($B_{700}$ field) may be substantially parallel to the active face (e.g., the uppermost face) of the Hall sensor 720, as shown in FIG. 7. Accordingly, the $B_{700}$ field may be parallel to a current ($\Phi_{700}$) that flows through the active face of the Hall sensor 720, thereby resulting in a zero magnitude y-component vector for the $B_{700}$ field. As such the resulting magnetic flux ($\Phi_{700}$) may comprise a minimum magnitude, e.g., the $\Phi_{700}$ may be equal to about zero or some relatively small non-zero value.

Figure 8:
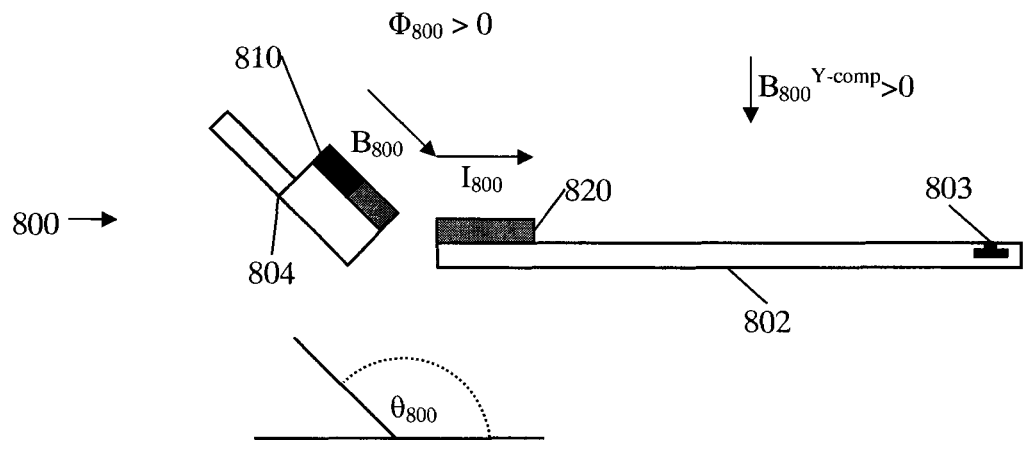
FIG. 8 illustrates another embodiment of a USB dongle configured to utilize a Hall sensor to detect a hinge angle.

FIG. 8 illustrates an embodiment of a USB dongle 800 comprising a USB PCB 802, an antenna 803, a USB connector 804, a magnet 810, and a Hall sensor 820 that may be configured substantially similarly to the USB PCB 702, the antenna 703, the USB connector 704, the magnet 710, and the Hall sensor 720. The USB dongle 800 may comprise a hinge angle of about $\theta_{800}$ (where $90°<\theta_{800}<180°$) such that the magnet's 810 magnetic field ($B_{800}$ field) may be obtuse to the active face (e.g., the uppermost face) of the Hall sensor 820, as shown in FIG. 8. Accordingly, the $B_{800}$ field may be obtuse to a current ($I_{800}$) that flows through the active face of the Hall sensor 820, thereby resulting in a non-zero magnitude y-component vector for the $B_{800}$ field. The absolute magnitudes of the $B_{800}$ field and the $I_{800}$ may be substantially the same as the absolute magnitudes of the $B_{700}$ field and the $I_{700}$ (respectively). As such the resulting magnetic flux ($\Phi_{800}$) may comprise an intermediate magnitude that is greater than the minimum magnitude, e.g., the $\Phi_{800}$ may be greater than $\Phi_{700}$.

Figure 9:
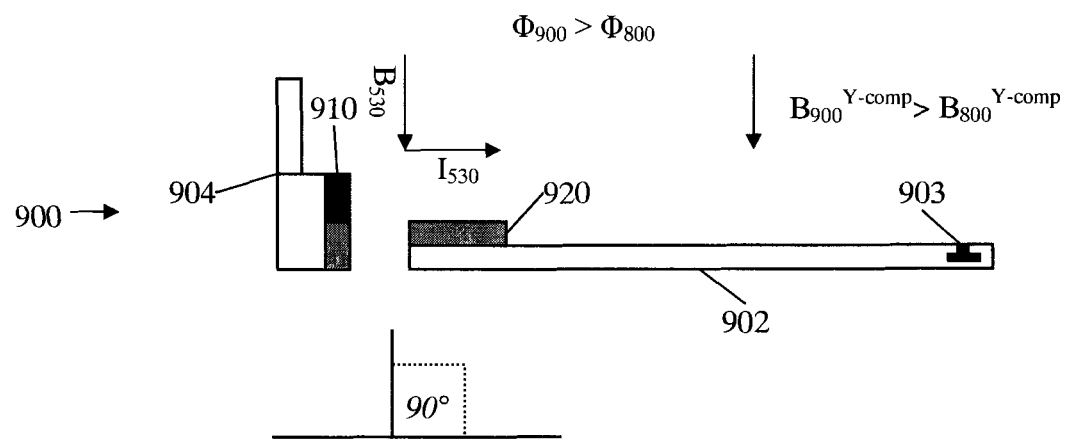
FIG. 9 illustrates another embodiment of a USB dongle configured to utilize a Hall sensor to detect a hinge angle.

FIG. 9 illustrates an embodiment of a USB dongle 900 comprising a USB PCB 902, an antenna 903, a USB connector 904, a magnet 910, and a Hall sensor 920 that may be configured substantially similarly to the USB PCB 702, the antenna 703, the USB connector 704, the magnet 710, and the Hall sensor 720. The USB dongle 900 may comprise a hinge angle of about 90° such that the magnet 910 produces a specific magnetic field ($B_{900}$ field) that is perpendicular (e.g., 90°) to the active face (e.g., the uppermost face) of the Hall sensor 900, as shown in FIG. 9. Accordingly, the $B_{900}$ field may be perpendicular to a current ($I_{900}$) that flows through the active face of the Hall sensor 920, thereby resulting in a non-zero magnitude y-component vector for the $B_{900}$ field. The absolute magnitudes of the $B_{900}$ field and the $I_{900}$ may be substantially the same as the absolute magnitudes of the $B_{800}$ field and the $I_{800}$ (respectively). As such, the resulting magnetic flux ($\Phi_{900}$) may comprise a maximum magnitude that is greater than the intermediate magnitude, e.g., the $\Phi_{900}$ may be greater than $\Phi_{800}$.

Figure 10:
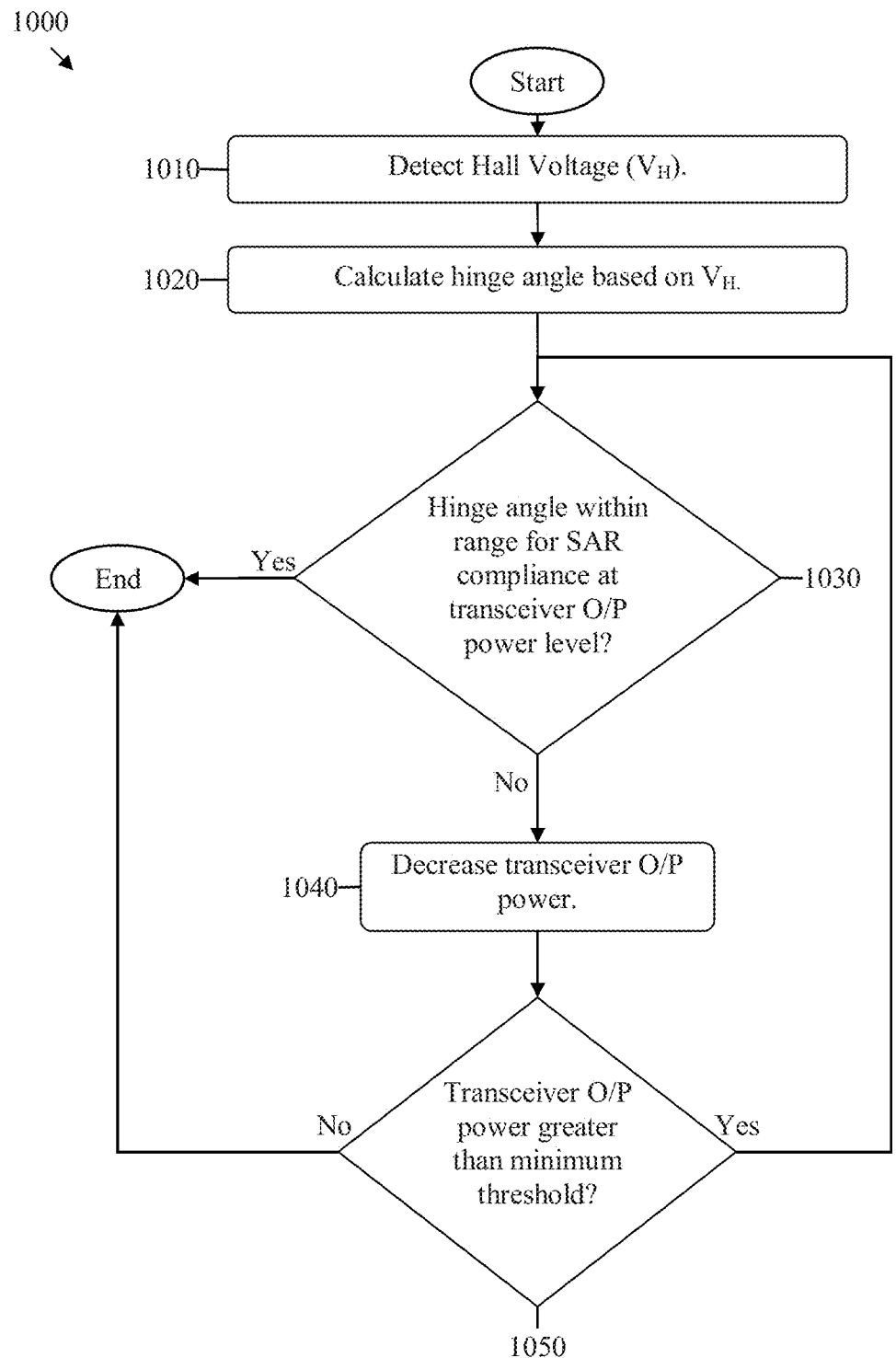
FIG. 10 illustrates a flowchart of an embodiment of a method for meeting SAR compliance criteria.
Figure 11:
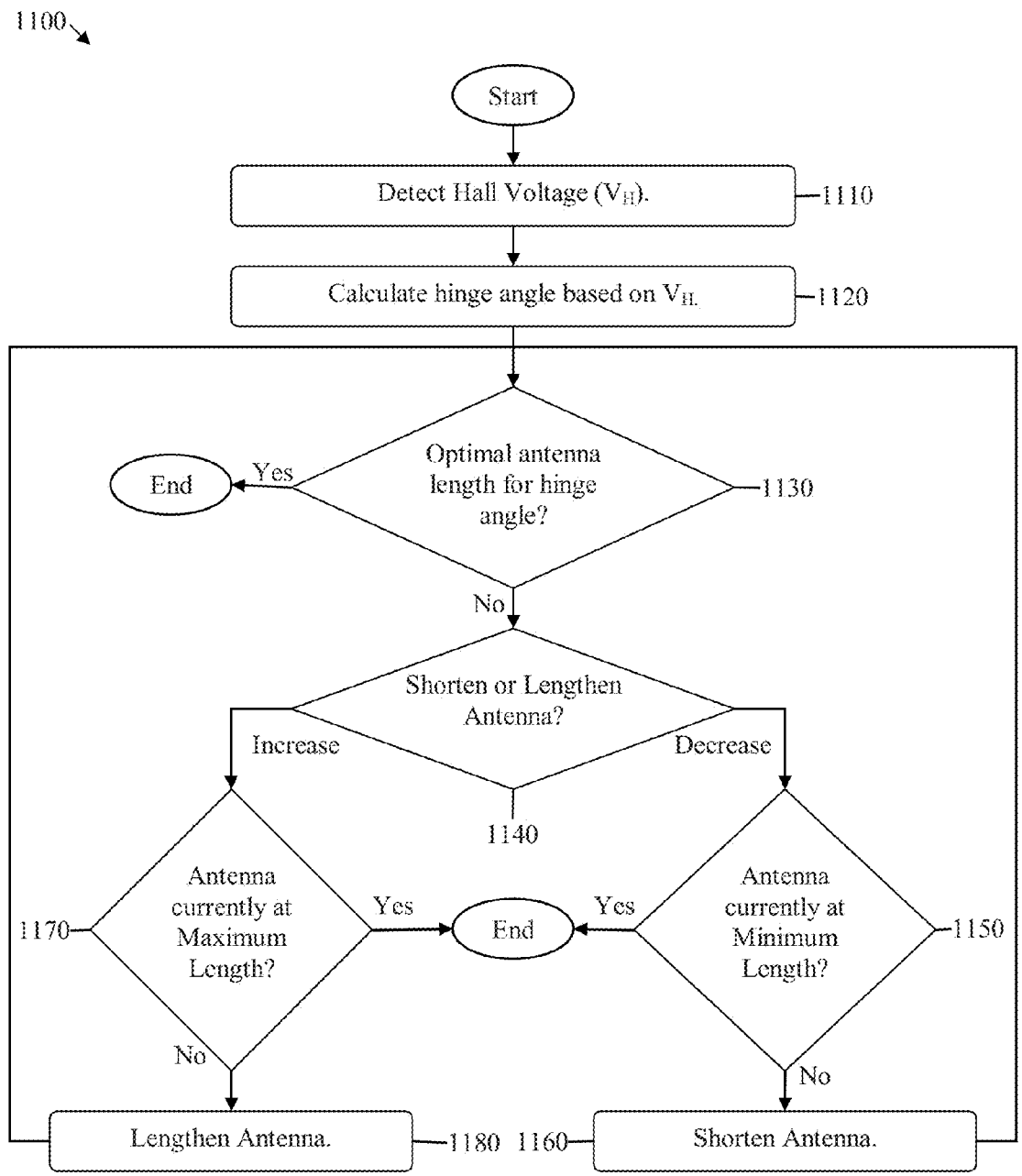
FIG. 11 illustrates a flowchart of an embodiment of a method for tuning an antenna.

As is consistent with the above description, a magnetic flux through the active face of a Hall sensor may increase as the hinge angle moves from 180° to 90°, and therefore the $V_H$ (which may be proportional to magnetic flux) detected by the Hall sensor may increase accordingly. As such, the $V_H$ detected by the Hall sensor may be used to calculate the hinge angle. In some embodiments, a USB dongle's hinge angle may be used to determine an appropriate transceiver O/P power level for SAR compliance. FIG. 10 illustrates a method of for meeting SAR compliance criteria 1000 consistent with an embodiment, which may be executed by a USB dongle, a consumer host device, or both. The method 1000 may begin at step 1010, where a Hall sensor may detect a $V_H$ and communicate an output signal comprising the $V_H$ (or some derivative thereof) to a processor. At step 1020, the processor may calculate the hinge angle of the USB dongle based on the $V_H$. At step 1030, the processor may determine whether the hinge angle is within a range (e.g., defined by an upper threshold and a lower threshold) for SAR compliance at the current transceiver O/P power level. If so, the method 1000 may end. Otherwise, the method 1000 may proceed to step 1040, where the transmitter power may be decreased by a set amount, e.g., by X dBm (X is greater than zero). At step 1050, the processor may determine whether the transceiver O/P power is greater than a predetermined minimum threshold. In an embodiment, the predetermined minimum threshold may correspond to a predetermined transceiver O/P power that satisfies SAR requirements for the USB dongle's highest radioactive position, e.g. when the hinge angle is equal to about 180°. If not, the user may, optionally, be prompted, and the method 1000 may end. Otherwise (i.e., if the transceiver O/P power is greater than a predetermined minimum threshold), then the method 1000 may revert back to step 1030, where the steps 1030-1050 may be repeated until SAR compliance is achieved or until the transceiver O/P power is decreased to about the predetermined minimum threshold. In the same or other embodiments, the USB dongle's hinge angle may be used to optimize antenna performance. FIG. 11 illustrates a method for optimizing antenna performance 1100 that is consistent with an embodiment. The method 1100 may start at step 1110, where a Hall sensor may detect a $V_H$ and communicate an output signal comprising the $V_H$ (or some derivative thereof) to a processor. At step 1120, the processor may calculate the hinge angle of the USB dongle based on the $V_H$. At step 1130, the processor may determine whether the antenna length is optimized for the calculated hinge angle. If so, the method 1100 may end. Otherwise, the method 1100 may proceed to step 1140, where the processor may determine whether or not the antenna needs to be shortened or lengthened to optimize the antenna's performance at the hinge angle. If the antenna needs to be shortened to optimize the antenna's performance, then the method 1100 may proceed to step 1150, where the processor may determine whether the antenna is currently at its minimum length (e.g., whether the antenna can be shortened any further). If not (e.g., if the antenna is not at its minimum length, and therefore can be shortened further), then the method 1100 may proceed to step 1160, where the antenna may be shortened by a set amount. Subsequently the method may revert back to step 1130, where the sequence of steps 1130-1160 may be repeated until either the antenna length is optimized (e.g., step 1130) or the antenna length reaches a minimum length (e.g., method 1100 ends at step 1150). Otherwise (e.g., if the antenna cannot be shortened any further), then the user may, optionally, be prompted and the method 1100 may end.

Referring again to step 1140, if the antenna needs to lengthened to optimize the antenna's performance, then the method 1100 may proceed to step 1170, where the processor may determine whether the antenna is currently at its maximum length (e.g., whether the antenna can be lengthened any further). If not (e.g., if the antenna is not at its maximum length, and therefore can be lengthened), then the method 1100 may proceed to step 1180, where the antenna may be lengthened by a set amount. Subsequently the method may revert back to step 1130, where the sequence of steps 1130-1160 may be repeated until either the antenna length is optimized (e.g., step 1130) or the antenna length reaches a minimum length (e.g., method 1100 ends at step 1150). Otherwise (e.g., if the antenna cannot be lengthened any further), then the user may, optionally, be prompted and the method 1100 may end. In some embodiments of the method 1100, the processor may access a table that specifies an antenna length for each hinge angle (e.g., at step 1180 and/or step 1160). In such embodiments, step 1160/1180 may shorten/lengthen the antenna to an antenna length specified for the calculated hinge angle and the method 1100 may end such that there may be no loop (e.g., the method may not revert back to step 1130 after steps 1150/1170). Optionally, the steps 1170/1150 may be omitted (e.g., assuming that the table does not specify an antenna length that is outside of the antenna's tunable range).

In some embodiments of the method 1000 and/or the method 1100, the user may be prompted to adjust the hinge angle. For instance (in method 1000), the user may be prompted to adjust the hinge angle when the transceiver O/P power is reduced to the predetermined minimum threshold (e.g., after step 1050) so that the wireless connection can be reestablished, re-optimized, or otherwise improved. Further (in method 1100), the user may be prompted to adjust the hinge angle when the antenna cannot be lengthened or shortened to a length necessary to optimize antenna performance (e.g., after step 1170 or step 1150, respectively).

Figure 12:
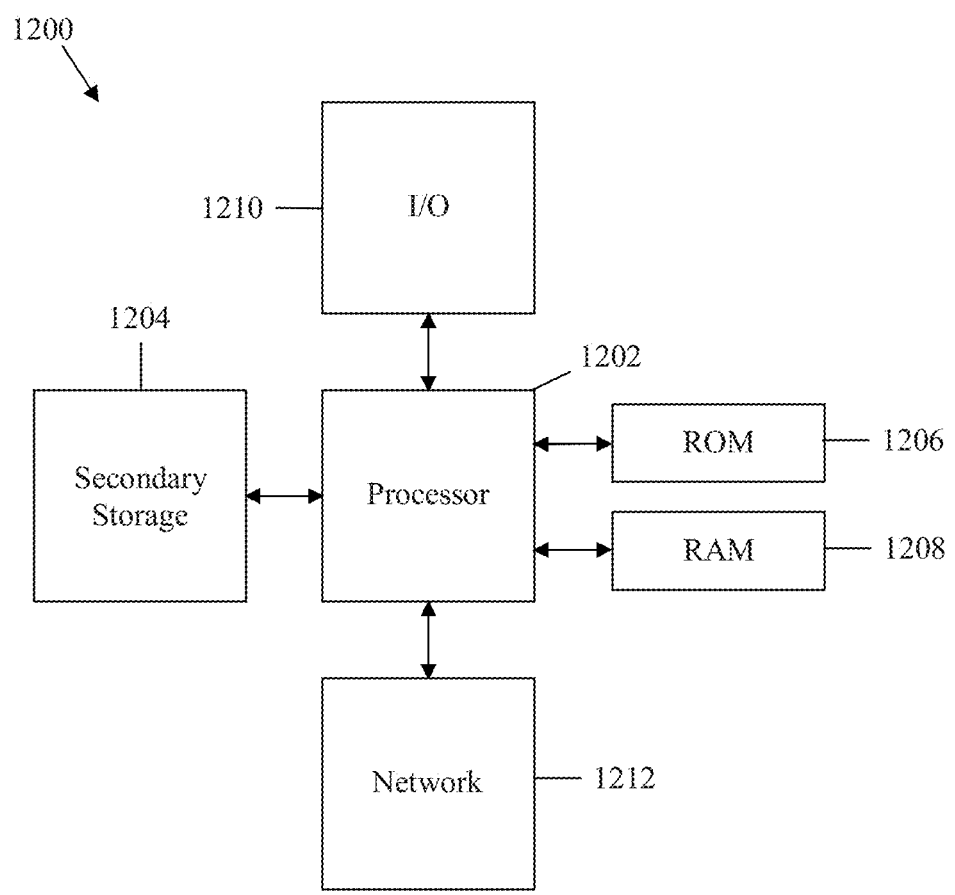
FIG. 12 is an embodiment of a general-purpose computer system.

FIG. 12 illustrates a typical, general-purpose computer, suitable for implementing one or more embodiments of any component disclosed herein. The computer 1200 includes a processor 1202 (which may be referred to as a central processor unit or CPU) that is in communication with memory devices including secondary storage 1204, read only memory (ROM) 1206, random access memory (RAM) 1208, input/output (I/O) devices 1210, and network connectivity devices 1212. The processor may be implemented as one or more CPU chips, or may be part of one or more application specific integrated circuits (ASICs).

The secondary storage 1204 is typically comprised of one or more disk drives or tape drives and is used for non-volatile storage of data and as an over-flow data storage device if RAM 1208 is not large enough to hold all working data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage 1204. The RAM 1208 is used to store volatile data and perhaps to store instructions. Access to both ROM 1206 and RAM 1208 is typically faster than access to secondary storage 1204.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   a connector;
   an antenna connected to the connector; and
   a processor configured to detect a plurality of angular positions of the connector relative to the antenna based on a Hall voltage ($V_H$) that corresponds to a magnetic flux passing through a Hall Effect sensor,
   wherein the angular positions correspond to a plurality of values of the $V_H$.

2. The apparatus of claim 1, further comprising: a magnet affixed to the connector, wherein the Hall Effect sensor is affixed to the antenna.

3. The apparatus of claim 2, wherein the magnetic flux is produced by the magnet's magnetic field, and wherein the values of $V_H$ increase as the angular positions for the connector approach 90° relative to the antenna.

4. The apparatus of claim 1 further comprising: a magnet affixed to the antenna, wherein the Hall Effect sensor is affixed to the connector, and wherein the values of $V_H$ decrease as the angular positions for the connector approach 180° relative to the antenna.

5. An apparatus comprising:
   a connector;
   an antenna connected to the connector; and
   a processor configured to:
     detect a connector's angular position relative to the antenna based on a Hall voltage ($V_H$) that corresponds to a magnetic flux passing through a Hall Effect sensor; and
     determine whether the connector's angular position is between an upper threshold and a lower threshold associated with a Specific Absorption Rate (SAR) compliance criteria.

6. The apparatus of claim 5, wherein the processor is further configured to reduce the antenna's output power from a current power level to a reduced power level when the connector's angular position is not between the upper threshold and the lower threshold.

7. An apparatus comprising:
a connector;
an antenna connected to the connector; and
a processor configured to:
- detect a connector's angular position relative to the antenna based on a Hall voltage ($V_H$) that corresponds to a magnetic flux passing through a Hall Effect sensor; and
- determine an optimum antenna length based on the connector's angular position.

8. The apparatus of claim 7, wherein the antenna is not part of a printed circuit board (PCB).

9. An apparatus comprising:
a connector;
an antenna connected to the connector; and
a processor configured to:
- detect a connector's angular position relative to the antenna based on a Hall voltage ($V_H$) that corresponds to a magnetic flux passing through a Hall Effect sensor; and
- tune a first antenna matching circuit to increase the antenna's efficiency at the connector's angular position.

10. An apparatus comprising:
a connector;
an antenna connected to the connector; and
a processor configured to detect a connector's angular position relative to the antenna based on a Hall voltage ($V_H$) that corresponds to a magnetic flux passing through a Hall Effect sensor,
wherein the $V_H$ comprises a minimum value when the connector is parallel to the antenna, and wherein the $V_H$ comprises a maximum value when the connector is perpendicular to the antenna.

11. An apparatus comprising:
a connector;
an antenna connected to the connector; and
a processor configured to detect a connector's angular position relative to the antenna based on a Hall voltage ($V_H$) that corresponds to a magnetic flux passing through a Hall Effect sensor,
wherein the $V_H$ is greater than a minimum value but less than a maximum value when the connector's angular position relative to the antenna is between 180° and 90°.

12. An apparatus comprising:
a connector;
an antenna connected to the connector; and
a processor configured to detect a connector's angular position relative to the antenna based on a Hall voltage ($V_H$) that corresponds to a magnetic flux passing through a Hall Effect sensor,
wherein the $V_H$ is equal to zero when the connector's angular position relative to the antenna is equal to 180°.

13. An apparatus comprising:
a connector;
an antenna connected to the connector; and
a processor configured to detect a connector's angular position relative to the antenna based on a Hall voltage ($V_H$) that corresponds to a magnetic flux passing through a Hall Effect sensor,
wherein the connector is a Universal Serial Bus (USB) connector.

14. The apparatus of claim 13, wherein the USB connector is configured to be inserted into a USB port of a consumer device, and wherein the magnetic flux corresponds to a magnet affixed to the consumer device.

15. An apparatus comprising:
a connector;
an antenna connected to the connector; and
a processor configured to detect a connector's angular position relative to the antenna based on a Hall voltage ($V_H$) that corresponds to a magnetic flux passing through a Hall Effect sensor,
wherein the antenna is part of a printed circuit board (PCB).

16. A method comprising:
detecting a Hall voltage ($V_H$);
calculating, by a processor, an angle based on the $V_H$;
determining, by the processor, whether the angle is between an upper threshold and a lower threshold associated with a Specific Absorption Rate (SAR) compliance criteria; and
adjusting an antenna's output power based on the angle.

17. The method of claim 16, wherein the angle is not between the upper threshold and the lower threshold, and wherein the method further comprises reducing the antenna's output power from a normal power level to a reduced power level.

18. The method of claim 17, wherein the reduced power level comprises a predetermined minimum threshold, wherein a data-rate of a wireless connection is substantially reduced responsive to decreasing the antenna's output power, and wherein the method further comprises prompting a user to adjust the angle such that the angle is between the upper threshold and the lower threshold.

19. The method of claim 17, wherein a data rate of a wireless connection provided by the antenna is greater when the antenna's output power is at the normal power level than when the antenna's output power is at the reduced power level.

20. The method of claim 16, wherein the angle comprises a hinge angle between a Universal Serial Bus (USB) connector and an antenna, wherein a magnet is affixed to the USB connector, wherein a Hall sensor is proximate to the antenna, and wherein the magnet's magnetic field corresponds to the $V_H$.

21. A method comprising:
detecting a Hall voltage ($V_H$);
calculating, by a processor, an angle based on the $V_H$;
determining, by the processor, that an antenna is not optimized for the angle, and
adjusting the antenna based on the determination that the antenna is not optimized for the angle by changing a length of the antenna.

22. The method of claim 21 further comprising:
determining, by the processor, that optimizing the antenna requires lengthening the antenna; and
lengthening the antenna such that the antenna is tuned for the angle.

23. The method of claim 21 further comprising:
determining, by the processor, that optimizing the antenna requires shortening the antenna; and
shortening the antenna such that the antenna is tuned for the angle.

24. The method of claim 21 further comprising:
determining, by the processor, that optimizing the antenna requires lengthening the antenna;
determining, by the processor, that the antenna's length is currently at a maximum length; and
prompting a user to adjust the angle.

25. The method of claim 21 further comprising tuning a first antenna matching circuit to increase one or more wireless performance characteristics of the antenna at the angle.

26. The method of claim 25 further comprising substituting a second antenna matching circuit for the first antenna matching circuit, wherein the second antenna matching circuit increases one or more wireless performance characteristics at the angle when compared to the first antenna matching circuit.

27. The method of claim 21, wherein the angle corresponds to a Universal Serial Bus (USB) connector's angular position relative to a printed circuit board (PCB), and wherein the angle affects an efficiency of the antenna.

28. A system comprising:
   a first device comprising a connector affixed to an antenna; and
   a second device comprising a port,
   wherein the connector is inserted into the port such that the first device can communicate with the second device, and
   wherein a system component is configured to determine an angle between the connector and the antenna based on a Hall voltage ($V_H$).

29. The system of claim 28, wherein the system component is the first device.

30. The system of claim 29, wherein a magnet is affixed to the connector, wherein a Hall sensor is affixed to a protective housing comprising the antenna, and wherein the $V_H$ is determined by the Hall sensor.

31. The system of claim 29, wherein the magnet is affixed to the second device, wherein the hall sensor is affixed to the first device, and wherein the $V_H$ is measured by the Hall sensor.

32. The system of claim 28, wherein the system component is the second device.

33. The system of claim 32, wherein the hall sensor is affixed to the second device, wherein the magnet is affixed to the first device, and wherein the $V_H$ is determined by the Hall sensor.

34. The apparatus of claim 28, wherein the connector is a Universal Serial Bus (USB) connector, and wherein the antenna is coupled to or part of a printed circuit board (PCB).

* * * * *